United States Patent
Hiromichi et al.

(10) Patent No.: US 8,144,221 B2
(45) Date of Patent: Mar. 27, 2012

(54) IMAGE SENSOR APPARATUS AND METHODS EMPLOYING UNIT PIXEL GROUPS WITH OVERLAPPING GREEN SPECTRAL CONTENT

(75) Inventors: Tanaka Hiromichi, Gyeonggi-do (KR); Jung-yeon Kim, Busan (KR); Jin-hak Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 774 days.

(21) Appl. No.: 12/203,462

(22) Filed: Sep. 3, 2008

(65) Prior Publication Data
US 2009/0091647 A1  Apr. 9, 2009

(30) Foreign Application Priority Data
Oct. 5, 2007  (KR) .................. 10-2007-0100345

(51) Int. Cl.
*H04N 9/083* (2006.01)
*H04N 3/14* (2006.01)
*H04N 5/335* (2006.01)
*H04N 9/04* (2006.01)

(52) U.S. Cl. ...................................... 348/273; 348/280
(58) Field of Classification Search .................. 348/241, 348/273, 277, 279, 280; 382/162, 167
See application file for complete search history.

(56) References Cited

U.S. PATENT DOCUMENTS

| | | | | |
|---|---|---|---|---|
| 4,652,911 A | * | 3/1987 | Teranishi et al. | 348/279 |
| 5,136,370 A | * | 8/1992 | Chi | 348/279 |
| 2003/0067548 A1 | * | 4/2003 | Sugimori | 348/273 |
| 2010/0013966 A1 | * | 1/2010 | Feng et al. | 348/273 |

FOREIGN PATENT DOCUMENTS
CN  1323558 C  6/2007

OTHER PUBLICATIONS

Chinese Office Action Corresponding to Application No. 200810209886.5; Dated: Aug. 24, 2011; 7 pages.

* cited by examiner

*Primary Examiner* — Alicia M Harrington
(74) *Attorney, Agent, or Firm* — Myers Bigel Sibley & Sajovec, P.A.

(57) ABSTRACT

An apparatus includes an array of color-selective sensors arranged as a plurality of repeating 2×2 unit pixel groups. Each sensor of a unit pixel group of the array is selective for a color including a green component. The unit pixel group includes respective sensors selective for respective first and second colors and two sensors selective for a third color. Signals from the sensors of the unit pixel groups may define a first color signal space, and the apparatus may further include an image processor circuit configured to receive image sensor signals from the array of color-selective sensors and to process the image sensor signals to generate image signals in a second color signal space.

24 Claims, 16 Drawing Sheets

| Ye11 | G12 | Ye13 | G14 | Ye15 |
|------|-----|------|-----|------|
| Cy21 | G22 | Cy23 | G24 | Cy25 |
| Ye31 | G32 | Ye33 | G34 | Ye35 |
| Cy41 | G42 | Cy43 | G44 | Cy45 |
| Ye51 | G52 | Ye53 | G54 | Ye55 |

IMAGE SENSOR APPARATUS AND METHODS EMPLOYING UNIT PIXEL GROUPS WITH OVERLAPPING GREEN SPECTRAL CONTENT

CROSS-REFERENCE TO RELATED APPLICATION

This application claims priority under 35 U.S.C. §119 from Korean Patent Application No. 10-2007-0100345, filed Oct. 5, 2007, the disclosure of which is hereby incorporated by reference herein in its entirety.

FIELD OF THE INVENTION

The present invention relates to image sensors and methods of operation thereof and, more particularly, to color image sensors and methods of operation thereof.

BACKGROUND OF THE INVENTION

CMOS image sensors (CISs) are commonly used in consumer electronics products, such as digital still cameras, video recorders and photo-capable mobile terminals. In a typical device, an array of CISs are used to capture light energy and output corresponding electrical signals, with each sensor typically corresponding to a pixel of an image. Typically, a CIS only discriminates light intensity information. In order to provide color discrimination, color filters are typically arranged over the sensor array to filter particular color components of the light so that individual sensors may provide color component information.

In order to produce high definition images, CISs generally need to be reduced in size such that a larger number of sensors may be employed in a given area. However, increasing sensor integration density may cause an increase in crosstalk among the sensors, which may cause a lowering of sensitivity. Crosstalk between sensors having different color filters may result in spectral distortion in individual sensor outputs, and may cause a decrease in signal-to-noise ratio (SNR) and color reproducibility.

Conventional techniques for compensating for crosstalk include amplifying the sensor output signal and/or using a color correction circuit to correct for the crosstalk. Such approaches may be limited due to increased noise and problems with color reproducibility.

Typical conventional imaging devices employ color interpolation. In a typical color interpolation process, signals from multiple adjacent pixels are combined to generate appropriate color information for a given pixel. For example, signals from adjacent red and green pixel sensors may be used to generate interpolated green and red signals for a blue pixel. Color interpolation may, however, introduce false color errors. A conventional approach to correcting false color error is to insert an optical low pass filter (OLPF) between each sensor and the lens from which it receives incident light.

SUMMARY OF THE INVENTION

Some embodiments of the present invention provide an apparatus including an array of color-selective sensors arranged as a plurality of repeating 2×2 unit pixel groups. Each sensor of a unit pixel group of the array is selective for a color including a green component. The unit pixel group includes respective sensors selective for respective first and second colors and two sensors selective for a third color. Signals from the sensors of the unit pixel groups may represent colors in a first color signal space, and the apparatus may further include an image processor circuit configured to receive image sensor signals from the array of color-selective sensors and to process the image sensor signals to generate image signals in a second color signal space. For example, the image processor circuit may include an interpolator circuit configured to generate, for a pixel having a color filter of a first one of the first, second and third colors, interpolated color signals corresponding to respective second and third ones of the first, second and third colors. A color corrector circuit may be configured to receive the interpolated color signals and to combine the interpolated color signals to produce RGB signals. The image processor circuit may be further configured to generate a chrominance signal from the RGB signals and to generate a luminance signal from the interpolated color signals. The image processor circuit may also be configured to identify a false color error pixel from image signals received from the color-selective sensors and to responsively compensate an interpolated color signal for the identified false color error pixel.

In certain embodiments, a first column of the unit pixel group includes a yellow filtered sensor and a cyan filtered sensor and a second column of the unit pixel group includes two green filtered sensors. The apparatus may include an image processor circuit configured to generate respective sets of yellow, cyan and first and second green signals for respective pixels and to combine the yellow, cyan and two green signals of the respective sets of yellow, cyan and first and second green signals to produce respective sets of RGB signals for the respective pixels. The image processor circuit may include a crosstalk corrector circuit configured to combine the yellow signal and the first green signal for a given pixel to generate a red signal of the RGB signal set for the given pixel, to combine the cyan signal and the second green signal for the given pixel to generate a blue signal of the RGB signal set for the given pixel, and to combine the first and second green signals for the given pixel to generate a green signal of the RGB signal set for the given pixel. For example, the crosstalk corrector circuit may be configured to subtract the first green signal from the yellow signal for the given pixel to generate the red signal of the RGB signal set for the given pixel, to subtract the second green signal from the cyan signal for the given pixel to generate the blue signal of the RGB signal set for the given pixel and to average the first and second green signals for the given pixel to generate the green signal of the RGB signal set for the given pixel. The image processor circuit may be further configured to apply a color correction matrix to the red signal, blue signal and the green signal of the RGB signal set for the given pixel to generate a color-corrected set of red, green and blue signals for the given pixel. The image processor circuit may include an interpolator circuit configured to receive image sensor signals from the array of color-selective sensors and to generate respective sets of yellow, cyan and first and second green signals for respective pixels from the received image sensor signals.

Additional embodiments of the present invention provide methods in which image sensor signals are generated from an array of color-selective sensors arranged as a plurality of repeating 2×2 unit pixel groups, each sensor of a unit pixel group selective for a color including a green component, the unit pixel group including respective sensors selective for first and second colors and two sensors selective for a third color. The first, second and third colors may form a first color signal space, and the image sensor signals may be processed to generate image signals in a second color signal space therefrom. Processing the image sensor signals to generate image signals in a second color signal space may include, for a pixel having a color filter of a first one of the first, second and third colors, interpolating color signals corresponding to respective second and third ones of the first, second and third colors and combining the interpolated color signals to produce RGB signals. The methods may further include generating a chrominance signal from the RGB signals and generating a luminance signal from the interpolated color signals.

Additional embodiments of the present invention provide crosstalk correction methods including receiving a set of color signals for a pixel, the set of color signals including a yellow signal, a cyan signal, a first green signal and a second green signal. The yellow signal and the first green signal are combined to generate a red signal of an RGB signal set. The cyan signal and the second green signal are combined to generate a blue signal of the RGB signal set. The first and second green signals are combined to generate the green signal of the RGB signal set. Combining the yellow signal and the first green signal to generate a red signal of the RGB signal set may include subtracting the first green signal from the yellow signal to generate the red signal of the RGB signal set. Combining the cyan signal and the second green signal to generate a blue signal of the RGB signal set may include subtracting the second green signal from the cyan signal to generate the blue signal of the RGB signal set. Combining the first and second green signals to generate the green signal of the RGB signal set may include averaging the first and second green signals to generate the green signal of the RGB signal set.

Still further embodiments of the present invention provide false color error correction methods for correcting false color errors generated by color signal interpolation from sensor signals from an array of pixel sensors including sensors of a first color and a sensors of a second color interleaved in a row of the array. For each pixel of the row, a difference between a sensor signal output of the sensor and a sensor signal output from a sensor of the same color nearest thereto in a first direction is determined. A pair of adjacent pixels of the first and second colors is identified responsive to the determined differences. Interpolated color signals for the identified pair of adjacent pixels are compensated. For example, compensating interpolated color signals for the identified pair of adjacent pixels may include, for the pixel of the first color, adding an average of color signal values for pixels of the second color on respective sides of the pixel of the first color to an interpolated color signal of the second color associated with the pixel of the first color and, for the pixel of the second color, subtracting an average of color signal values for pixels of the first color on respective sides of the pixel of the second color to an interpolated color signal of the first color associated with the pixel of the second color.

BRIEF DESCRIPTION OF THE DRAWINGS

FIGS. 14 and 15 are diagrams illustrating false color generation arising from interpolation of color signals in a sensor matrix according to some embodiments of the present invention.

DETAILED DESCRIPTION OF EMBODIMENTS OF THE INVENTION

Figure 1:
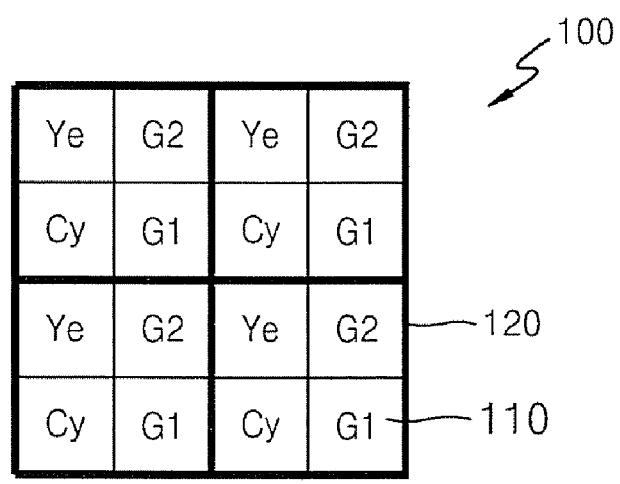
FIG. 1 is a circuit diagram illustrating an arrangement of unit pixel groups for an image sensor apparatus according to some embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As used herein, the term "and/or" includes any and all combinations of one or more of the associated listed items. It will be understood that when an element and/or component is referred to as being "connected to" and/or "coupled to" another element and/or component, the element and/or component may be directly connected and/or coupled to the other element and/or component, or intervening elements and/or components may be present. In contrast, when an element and/or component is referred to as being "directly connected to" and/or "directly coupled to" another element and/or component, no intervening elements and/or components are present.

It will also be understood that, although the terms "first," "second," etc., may be used herein to describe various elements and/or components, these elements and/or components should not be limited by these terms. Rather, these terms are used merely as a convenience to distinguish one element and/or component from another element and/or component. For example, a first element and/or component could be termed a second element and/or component without departing from the teachings of the present invention.

The terminology used herein is for the purpose of describing particular embodiments only and is not intended to limit of the invention. As used herein, the singular terms "a," "an" and "the" are intended to include the plural forms as well, unless the context clearly indicates otherwise. It will be further understood that the terms "comprise," "comprising," "includes," "including," "have", "having" and variants thereof specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention arise from a realization that image sensor apparatus and methods capable of high density and desirable cross-talk and color fidelity may be provided by using a repeating 2×2 rectangular unit pixel group arrangement wherein each sensor of a pixel group is selective for a color that includes a green component, including respective sensors selective for respective first and second colors (e.g., yellow and cyan) and two sensors selective for a third color (e.g., green). Such a pixel group arrangement may be used in conjunction with a color correction circuit to generate, for example, RGB signals with a desirable signal to noise ratio (SNR) and a relatively low level of space modulation in the green spectrum, which can improve definition. This may allow the image sensor to achieve a desirably high resolution.

Figure 2:
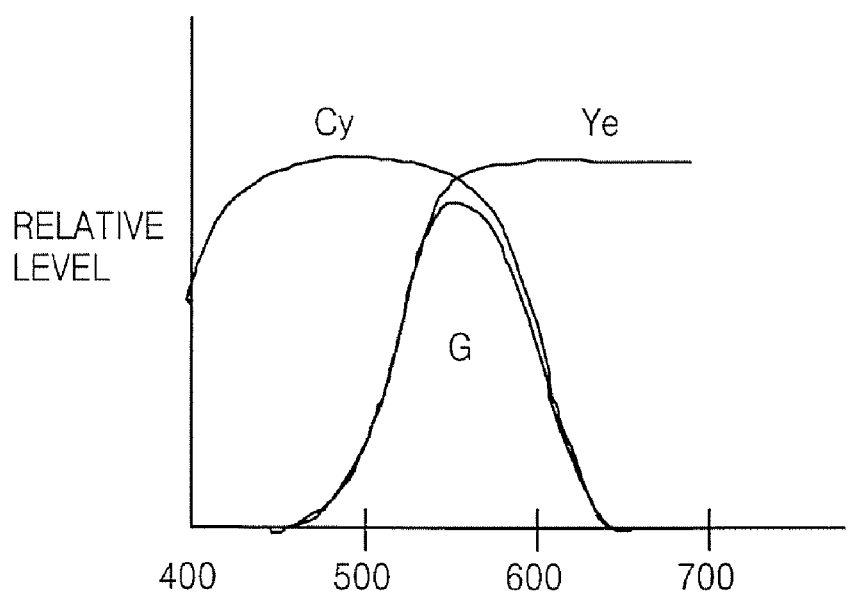
FIG. 2 is a diagram illustrating color spectrum relationships for sensors of the image sensor apparatus of FIG. 1.

FIG. 1 illustrates a pixel array 100 for an image sensor according to some embodiments of the present invention. The pixel array 100 is composed of yellow (Ye), green (G1, G2), and Cyan (Cy) pixels, arranged in repeating 2×2 unit pixel groups 110, each including a cyan pixel, a yellow pixel and two green pixels. Each of the pixels G1, G2, Cy, Ye is selective for a color, i.e., green, cyan or yellow, that includes a green component. This is illustrated by FIG. 2, which illustrates overlap of the yellow and cyan spectra with the green spectrum. It will be appreciated that the pixels G1, G2, Cy, Ye may be implemented using respective color filters having the appropriate spectral selectivity in conjunction with an image sensor device, such as a CIS. It will be further appreciated that other filter combinations may provide similar spectral properties.

Figure 3:
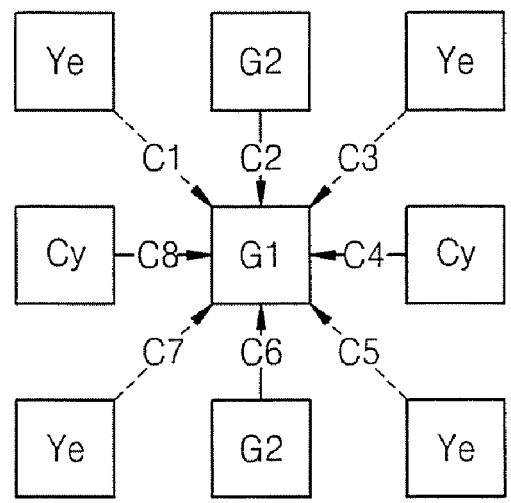
FIGS. 3-10 are diagrams illustrating crosstalk among pixel sensors of the image sensor apparatus of FIG. 1.
Figure 4:
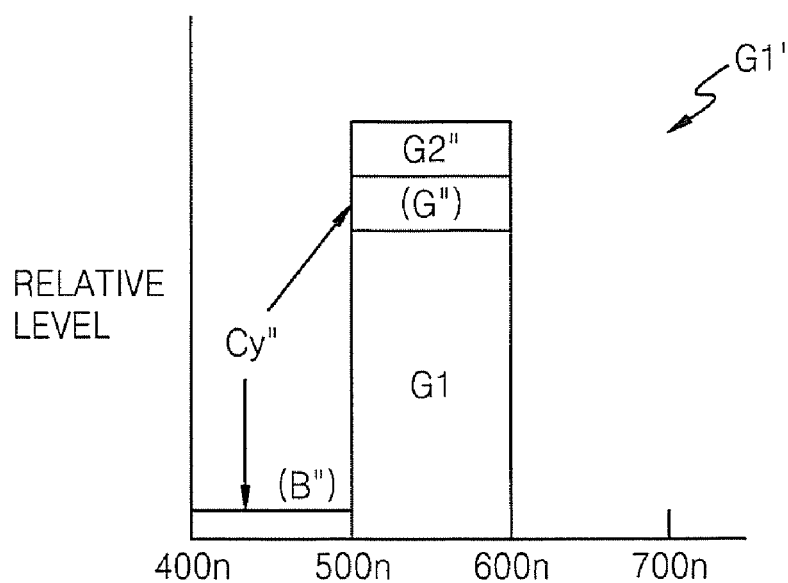

FIGS. 3 and 4 illustrate crosstalk characteristics for a first green pixel G1, i.e., a pixel having a sensor with a green color filter, of a unit pixel group from the array 100 illustrated in FIG. 1. Crosstalk G2″ attributable to adjacent green pixels G2 may be given by:

$$G2''=C2+C6,$$

where C2 and C6 represent additive components from the adjacent green pixels G2. Crosstalk Cy″ attributable to adjacent cyan pixels Cy may be given by:

$$Cy''=C4+C8,$$

where C4 and C8 represent additive components from the adjacent cyan pixels Cy. Crosstalk Ye″ from the adjacent yellow pixels Ye may be given by:

$$Ye''=C1+C3+C5+C7,$$

where C1, C3, C5, C7 are respective additive components from the adjacent yellow pixels Ye. The input G1′ for the green pixel G1 sensor may be given by:

$$G1'=G1+G2''+Cy''+Ye''.$$

However, the contributions from the diagonally adjacent yellow pixels Ye may be assumed to be negligible, such that the input G1′ may be simplified to:

$$G1'=G1+G2''+Cy''$$

As illustrated in FIG. 4, the input G1′ to the green pixel G1 sensor may be may be viewed as including a green component G1 contributed via the green pixel's own green filter, a green component G2″ contributed by the filters of the vertically adjacent green pixels G2, a green component G″ contributed by the filters of the horizontally adjacent cyan pixels Cy and a blue component B″ contributed by the filters of the horizontally adjacent cyan pixels Cy.

Figure 5:
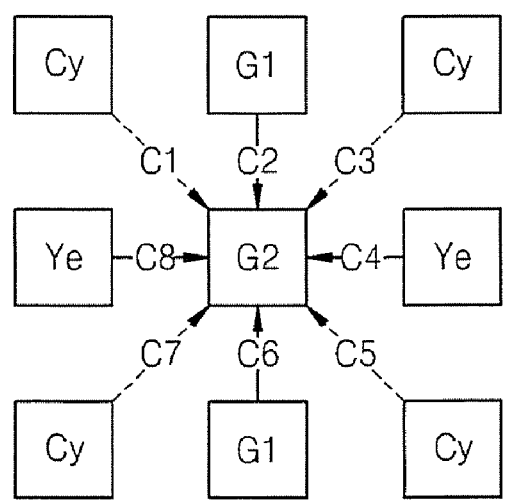
Figure 6:
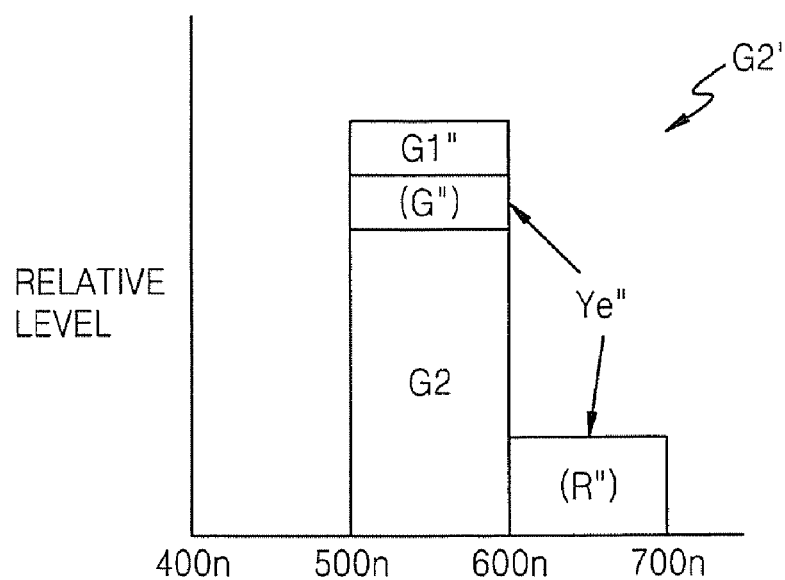

FIGS. 5 and 6 illustrate crosstalk characteristics for a second green pixel G2 of a unit pixel group from the array 100 illustrated in FIG. 1. Crosstalk G1″ from horizontally adjacent green pixels G1 may be given by:

$$G1''=C2+C6.$$

Crosstalk Ye″ from the horizontally adjacent yellow pixels Ye may be given by:

$$Ye''=C4+C8.$$

Crosstalk Cy″ from the diagonally adjacent cyan pixels Cy may be given by:

$$Cy''=C1+C3+C5+C7.$$

Assuming the contribution Cy″ from the diagonally adjacent cyan pixels Cy is negligible, the input G2′ to the green pixel G1 sensor may be given by:

$$G2'=G2+G1''+Ye''$$

As illustrated in FIG. 6, the input G2′ to the green pixel G2 sensor may be viewed as including a green component G2 contributed via the green pixel's own green filter, a green component G1″ contributed by the filters of the vertically adjacent green pixels G1, a green component G″ contributed by the filters of the horizontally adjacent yellow pixels Ye and a red component R″ contributed by the filters of the horizontally adjacent yellow pixels Ye.

Figure 7:
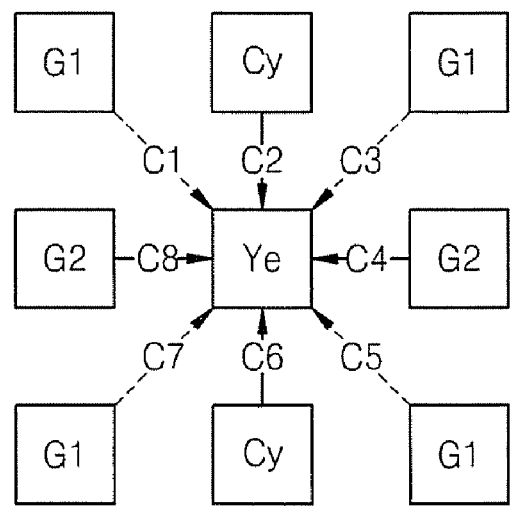
Figure 8:
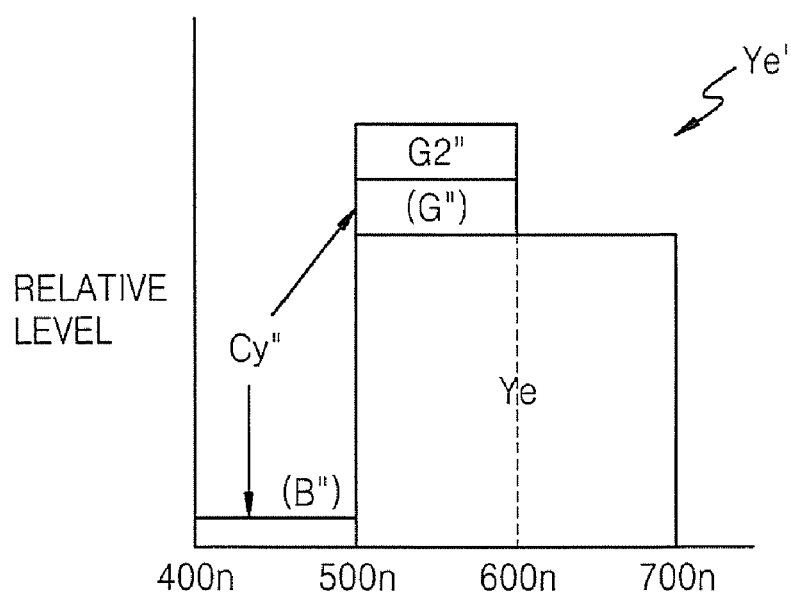

FIGS. 7 and 8 illustrate crosstalk characteristics for a yellow pixel Ye of a unit pixel group from the array 100 illustrated in FIG. 1. Crosstalk Cy″ from vertically adjacent cyan pixels Cy may be given by:

$$Cy''=C2+C6.$$

Crosstalk G2″ from horizontally adjacent green pixels G2 may be given by:

$$G2''=C4+C8.$$

Crosstalk G1″ from diagonally adjacent green pixels G1 may be given by:

$$G1''=C1+C3+C5+C7.$$

Assuming negligible contributions from the diagonally adjacent green pixels G1, the input Ye′ to the yellow pixel sensor may be given by:

$$Ye'=Ye+Cy''+G2''.$$

As illustrated in FIG. 8, the input Ye′ to the yellow pixel Ye sensor may be may be viewed as including a yellow component Ye contributed via the yellow pixel's own filter, a green component G2″ contributed by the filters of the horizontally adjacent green pixels G1, a green component G″ contributed by the filters of the vertically adjacent cyan pixels Cy and a blue component B″ contributed by the filters of the vertically adjacent cyan pixels Cy.

Figure 9:
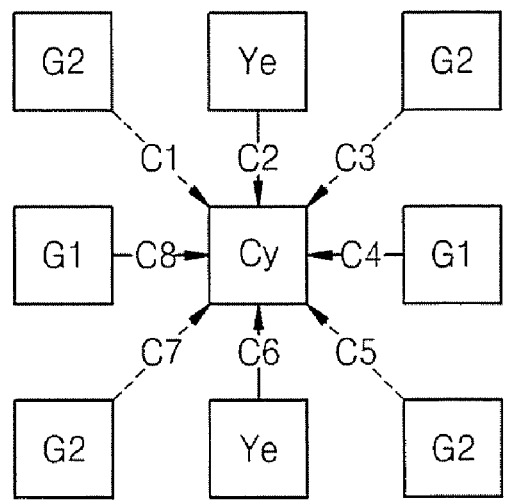
Figure 10:
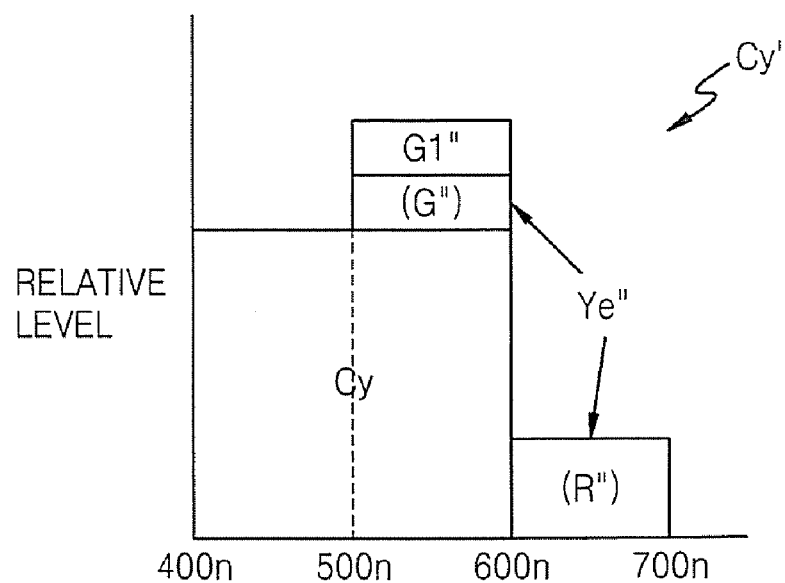

FIGS. 9 and 10 illustrate crosstalk characteristics for a cyan pixel Cy of a unit pixel group from the array 100 illustrated in FIG. 1. Crosstalk Ye″ from vertically adjacent yellow pixels Ye may be given by:

$$Ye''=C2+C6.$$

Crosstalk G1″ contributed by horizontally adjacent green pixels G1 may be given by:

$$G1''=C4+C8.$$

Crosstalk G2" contributed by diagonally adjacent green pixels G2 may be given by:

$$G2''=C1+C3+C5+C7.$$

Assuming the contribution from the diagonally adjacent green pixels G2 is negligible, the input Cy' to the cyan pixel Cy sensor may be given by:

$$Cy'=Cy+Ye''+G1''.$$

As illustrated in FIG. 10, the input Cy' to the cyan pixel Cy sensor may be viewed as including a cyan component Cy contributed via the cyan pixel's own filter, a green component G1" contributed by the filters of the horizontally adjacent green pixels G1, a green component G" contributed by the filters of the vertically adjacent yellow pixels Ye and a red component R" contributed by the filters of the vertically adjacent yellow pixels Ye.

Figure 11:
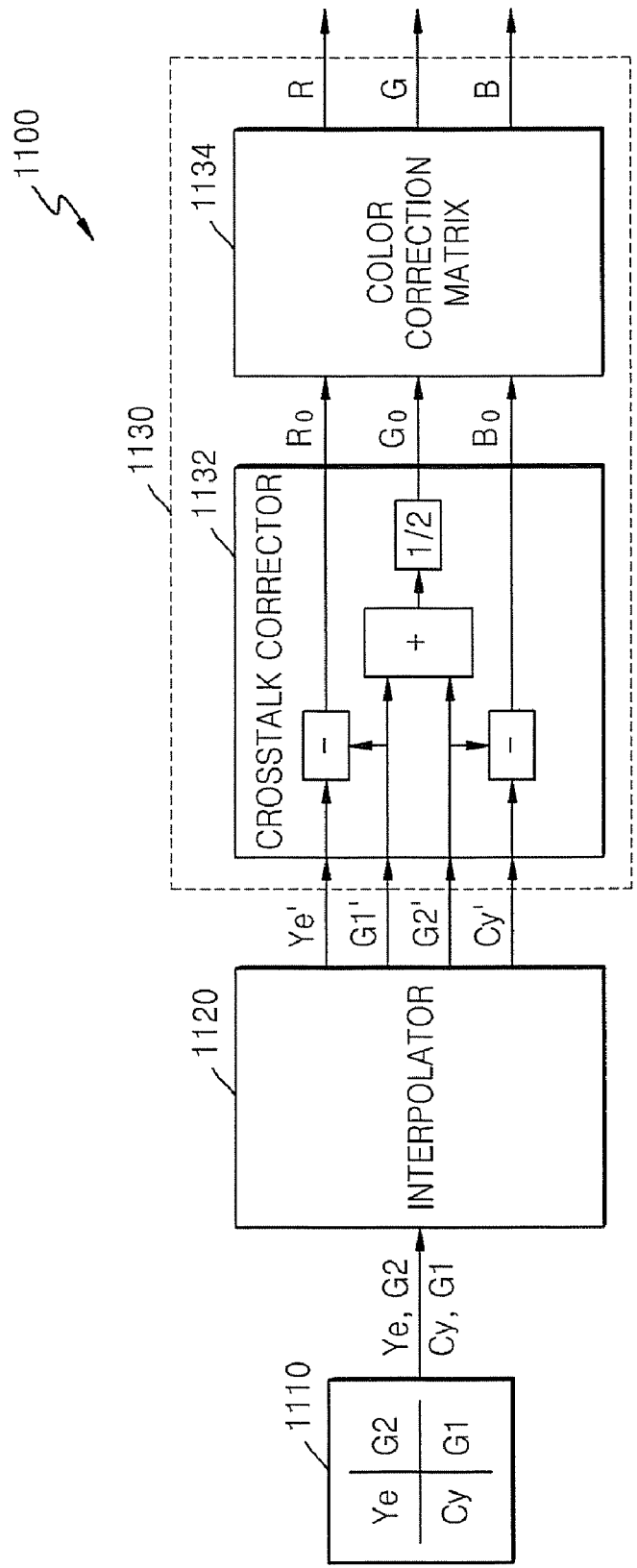
FIG. 11 is a block diagram illustrating an image sensor apparatus according to some embodiments of the present invention.

FIG. 11 illustrates an image sensor apparatus 1100 according to some embodiments of the present invention. The apparatus includes a pixel array 1110 including unit pixel groups arranged as described above with reference to FIGS. 1-10. Sensor signals Ye, G2, Cy, G1, i.e., signals from sensors corresponding to respective yellow, cyan and green filtered pixels in a unit pixel group, are provided to an interpolator circuit 1120, which produces complementary color signals for each pixel. In particular, for a pixel having a filter of a given color (e.g., green), the interpolator circuit 1120 interpolates signals for the other complementary colors (e.g., cyan and yellow) from signals from adjacent pixels having the complementary color filters. As the result, the interpolator produces output yellow, green and cyan signals Ye', G1', G2', Cy' that include signals correspond to the actual filter color of each respective pixels, along with interpolated values for the complementary colors for that pixel.

These signals are provided to a crosstalk corrector circuit 1132 of a color corrector circuit 1130, which responsively produces red, green and blue signals $R_0$, $G_0$, $B_0$. In particular, the crosstalk corrector circuit 1132 performs a crosstalk correction operation implementing the following matrix formulation:

$$\begin{bmatrix} R_0 \\ G_0 \\ B_0 \end{bmatrix} = \begin{bmatrix} 1 & -1 & 0 & 0 \\ 0 & 0.5 & 0 & 0.5 \\ 0 & 0 & 1 & -1 \end{bmatrix} \begin{bmatrix} Ye' \\ G1' \\ Cy' \\ G2' \end{bmatrix}$$

A color correction matrix circuit 1134 then applies a color correction (e.g., equalization) matrix to the red, green and blue signals $R_0$, $G_0$, $B_0$ to produce color-corrected red, green and blue signals R, G, B.

Assuming the interpolated yellow, green and cyan signals Ye', G1', G2', Cy' correspond to the yellow, green and cyan signals Ye', G1', G2', Cy' discussed above with reference to FIGS. 1-10:

$$G1'=G1+G2''+G''+B''$$

$$G2'=G2+G1''+G''+R''$$

$$Ye'=Ye+G''+B''+G2''$$

$$Cy'=Cy+G''+R''+G1''$$

Figure 12A:
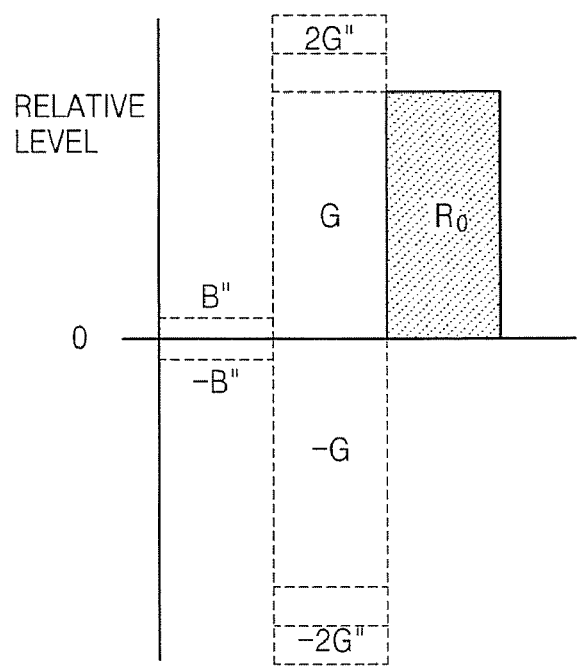
FIGS. 12a-c illustrate RGB signal generation in the image sensor apparatus of FIG. 11 according to further embodiments of the present invention.
Figure 12B:
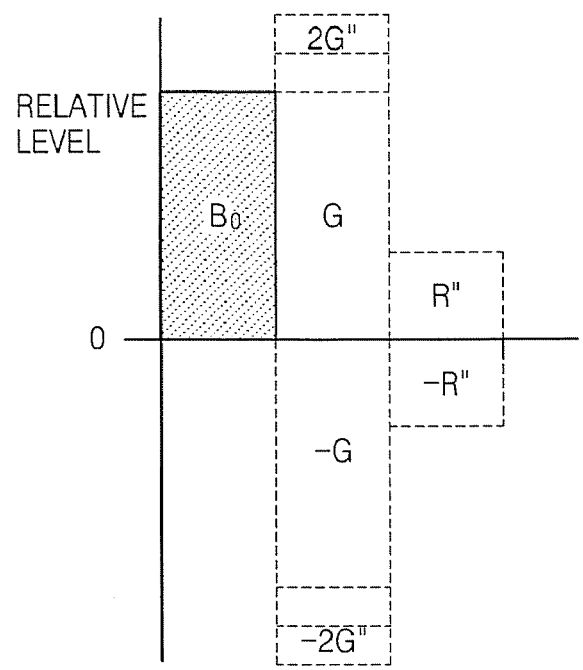
Figure 12C:
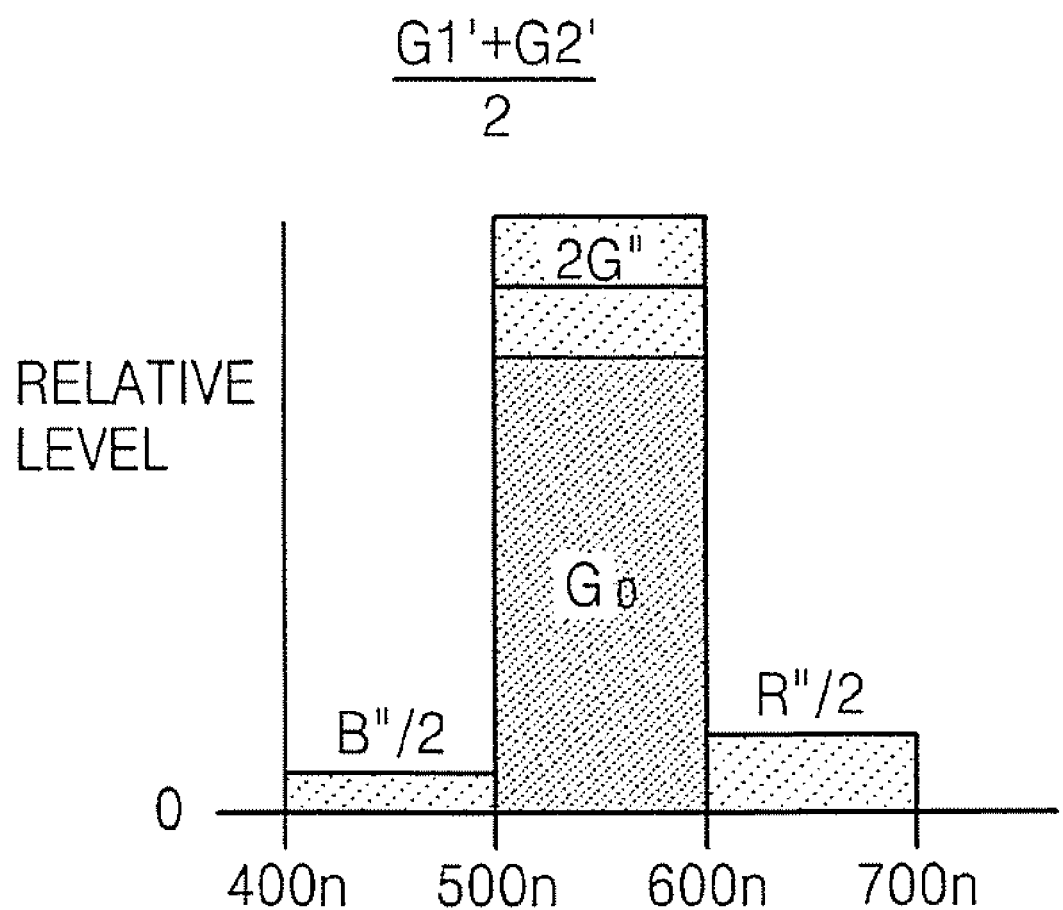

Thus, the red, green and blue signals $R_0$, $G_0$, $B_0$ produced by the crosstalk corrector circuit 1132 may be formed as indicated in FIGS. 12a, 12b and 12c, respectively. In particular, in the blue signal $B_0$ and the red signal $R_0$, crosstalk components G", B" and R" substantially offset one another. The green signal $G_0$ retains relatively small red and blue components, and provides a relatively intensified green component with respect to the red and blue signals $R_0$, $B_0$. Using the unit pixel grouping described, higher gain and enhanced signal to noise ratio (SNR) may be achieved. In addition, because each pixel contributes to the green signal $G_0$, space modulation in the green spectrum may be reduced, which can improve definition. This may allow the image sensor to achieve resolution approaching the Nyquist limit.

It will be appreciated that the interpolator circuit 1120 and color corrector circuit 1130 may, in general, be implemented using any of a variety of analog and/or digital circuits. For example, the interpolator 1120 may include analog to digital (A/D) converter circuitry configured to convert analog image signals generated by CMOS image sensors and digital circuitry configured to perform digital interpolation to produce the interpolated yellow, green and cyan signals Ye', G1', G2', Cy'. The color corrector circuit 1130 may digitally process the interpolated yellow, green and cyan signals Ye', G1', G2', Cy' to produce the red, green and blue signals R, G, B. It will be understood that such circuitry may be implemented, for example, using discrete components that perform the various functions of the interpolator circuit 1120 and the color corrector circuit 1130, and/or various groups of these functions may be integrated, for example, in one or more integrated circuits.

Figure 13:
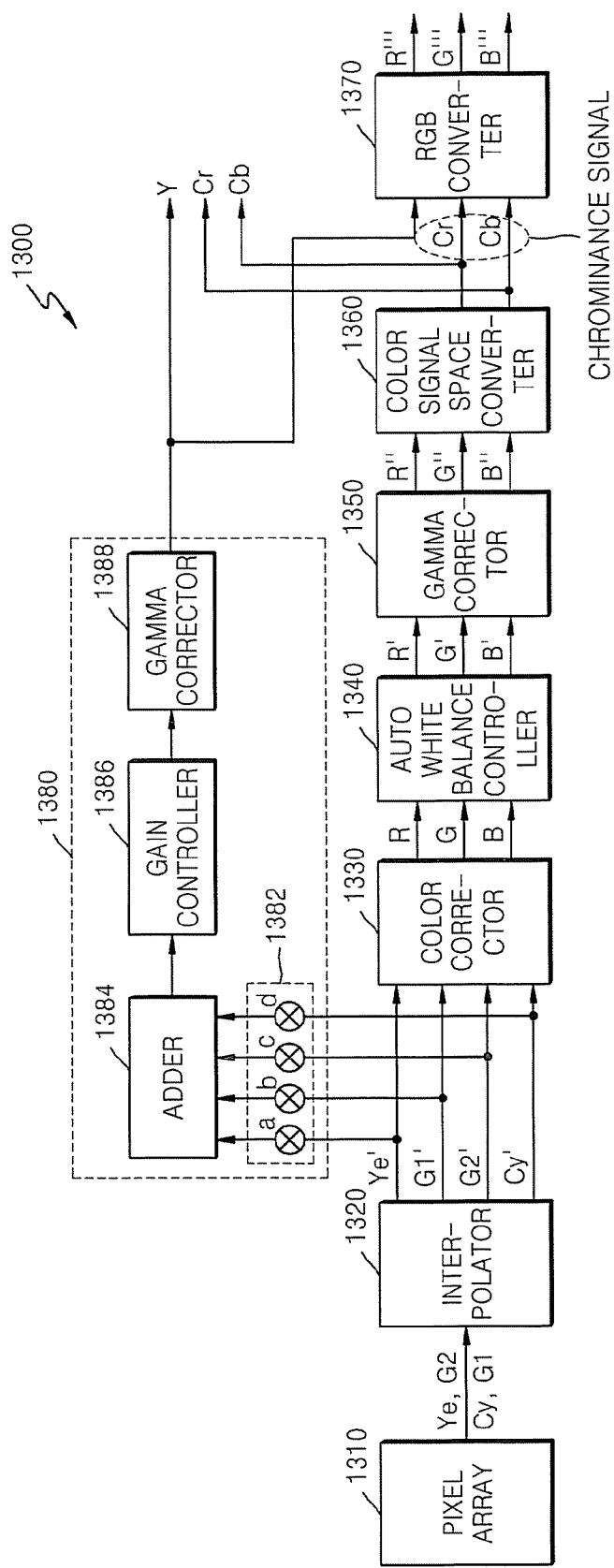
FIG. 13 is a block diagram illustrating an image sensor apparatus according to further embodiments of the present invention.

FIG. 13 illustrates an image capture system 1300 according to further embodiments of the present invention. The system 1300 includes a pixel array 1310 along lines discussed above, which produces yellow, cyan and green signals Ye, Cy, G1, G2 corresponding to sensor outputs from sensors having filters of those colors. The yellow, cyan and green signals Ye, Cy, G1, G2 are provided to an interpolator circuit 1320, which produces yellow, cyan and green signals Ye', Cy', G1', G2' that include interpolated color signals. The yellow, cyan and green signals Ye', Cy', G1', G2' are provided to a color correction circuit 1330, which may operate on the yellow, cyan and green signals Ye', Cy', G1', G2' as discussed above with reference to FIGS. 11 and 12 to produce red, green and blue signals R, G, B. The red, green and blue signals R, G, B may be provided to an auto white balance (AWB) controller circuit 1340, producing white-balanced signals R', G', B', which are in turn are subjected to gamma correction in a gamma corrector circuit 1350. Gamma-corrected red, green and blue signals R", G", B" produced by the gamma correction circuit 1350 are then converted to chrominance signals Cr, Cb by a color signal space converter circuit 1360.

As further shown in FIG. 13, the yellow, cyan and green signals Ye', Cy', G1', G2' are also provided to a luminance determiner circuit 1380, which responsively produces a luminance signal Y. In particular, the luminance determiner circuit 1380 includes a multiplier 1382 that multiplies respective ones of the yellow, cyan and green signals Ye', Cy', G1', G2' by respective coefficients a, b, c, d, producing scaled signals that are provided to an adder 1384. The output of the adder 1384 is provided to a gain controller circuit 1386 and a gamma corrector circuit 1388 to produce the luminance signal Y. The gain controller circuit 1386 may balance the luminance signal Y with the chrominance signals Cr, Cb. The luminance signal Y, along with the chrominance signals Cr, Cb may be provided to a RGB converter circuit 1370, which responsively produce luminance-corrected red, green and blue signals R, G, B.

Figure 15:
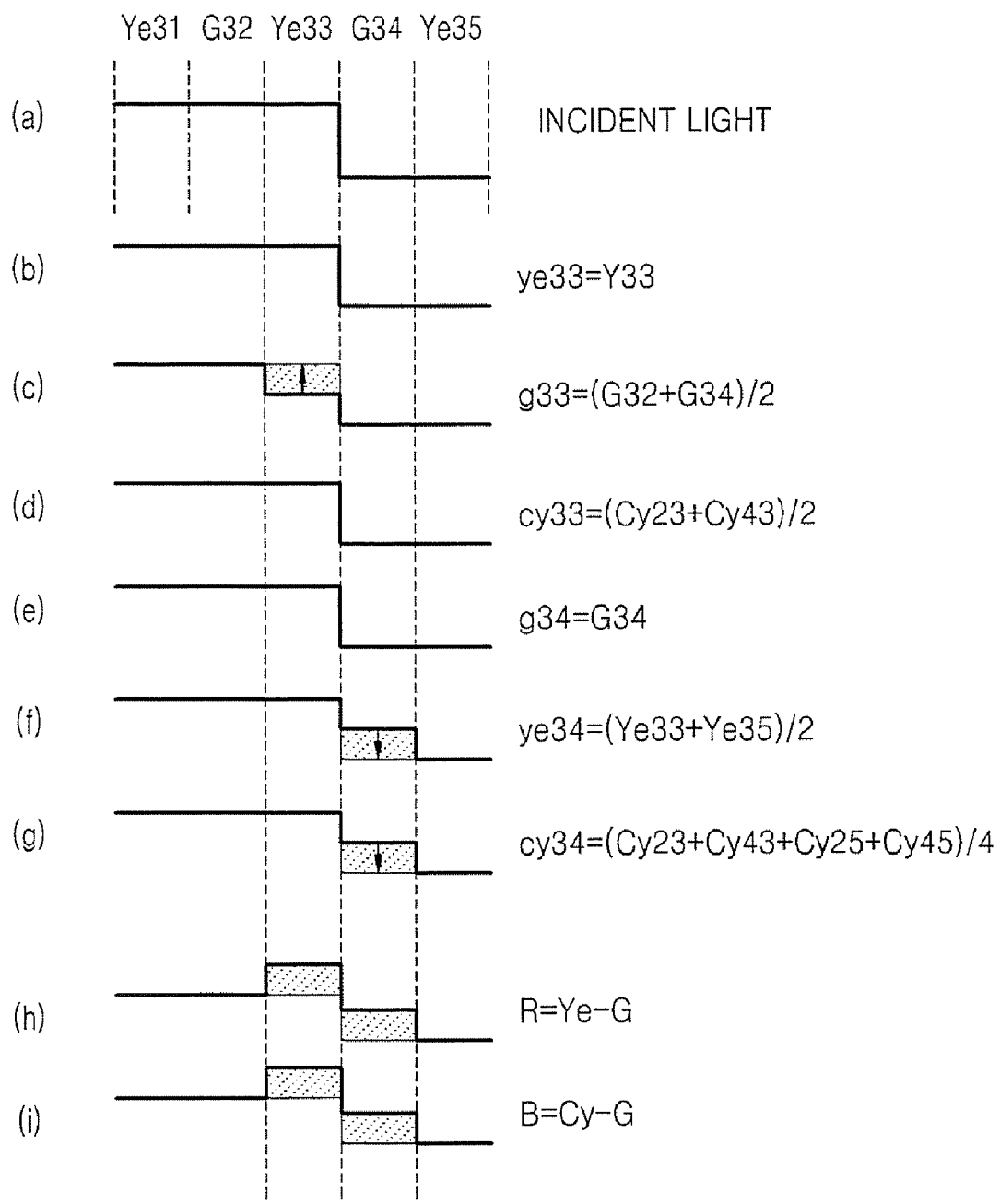

According to further embodiments of the present invention, false color correction may be performed on yellow, green and cyan signals prior to the color correction described above to correct false color errors that may arise from the interpolation process. FIGS. 14 and 15 illustrate an example of how a false color error may arise. A vertical boundary between "light" and "dark" areas of an image may occur, for example, at the boundary of a yellow pixel Ye33 and a horizontally adjacent green pixel G34 (see (a)). A yellow signal ye33 for the yellow pixel Ye33 and a green signal g34 for the horizontally adjacent green sensor G34 are correct, as these are simply equivalent to the sensor outputs (see (b) and (e)). Green and cyan signals g33, cy33 interpolated for the yellow pixel Y33 are also correct, as the sensor signals G32, G34, Cy23, Cy43 from which they are produced are all in the "light" region (see (c) and (d)).

The same is not true, however, for color signals interpolated across the "light/dark" boundary. For example, a green value g33 of the yellow pixel Y33 may be determined by interpolation between the values of the horizontally adjacent green pixels G32, G34, that is:

$$g33=(G32+G34)/2.$$

However, because the yellow pixel Ye33 is in the "light" region, the actual green value for the yellow pixel Ye33 should be substantially the same as the green pixel G32, i.e., interpolation using color information from the "dark" region produces a false green color signal g33 for the boundary pixel Ye33 (see (c)). Similarly, interpolation for yellow and cyan values ye34, cy34 for the adjacent green pixel G34 in the "dark" region from yellow and cyan sensor signals from adjacent pixels Ye33, Ye35, Cy23, Cy43, Cy25, Cy45 produces yellow and cyan signals ye34, cy34 that are too high (see (f) and (g)). As a result of these false color errors, color errors may be introduced into the red and blue signals R, B generated from these signals, as show in FIG. 15 (see (h) and (i)). Therefore, compensation of interpolated values (indicated by the arrows in FIG. 15) at boundary regions may be desirable in order to prevent generation of false colors due to interpolation.

Figure 16:
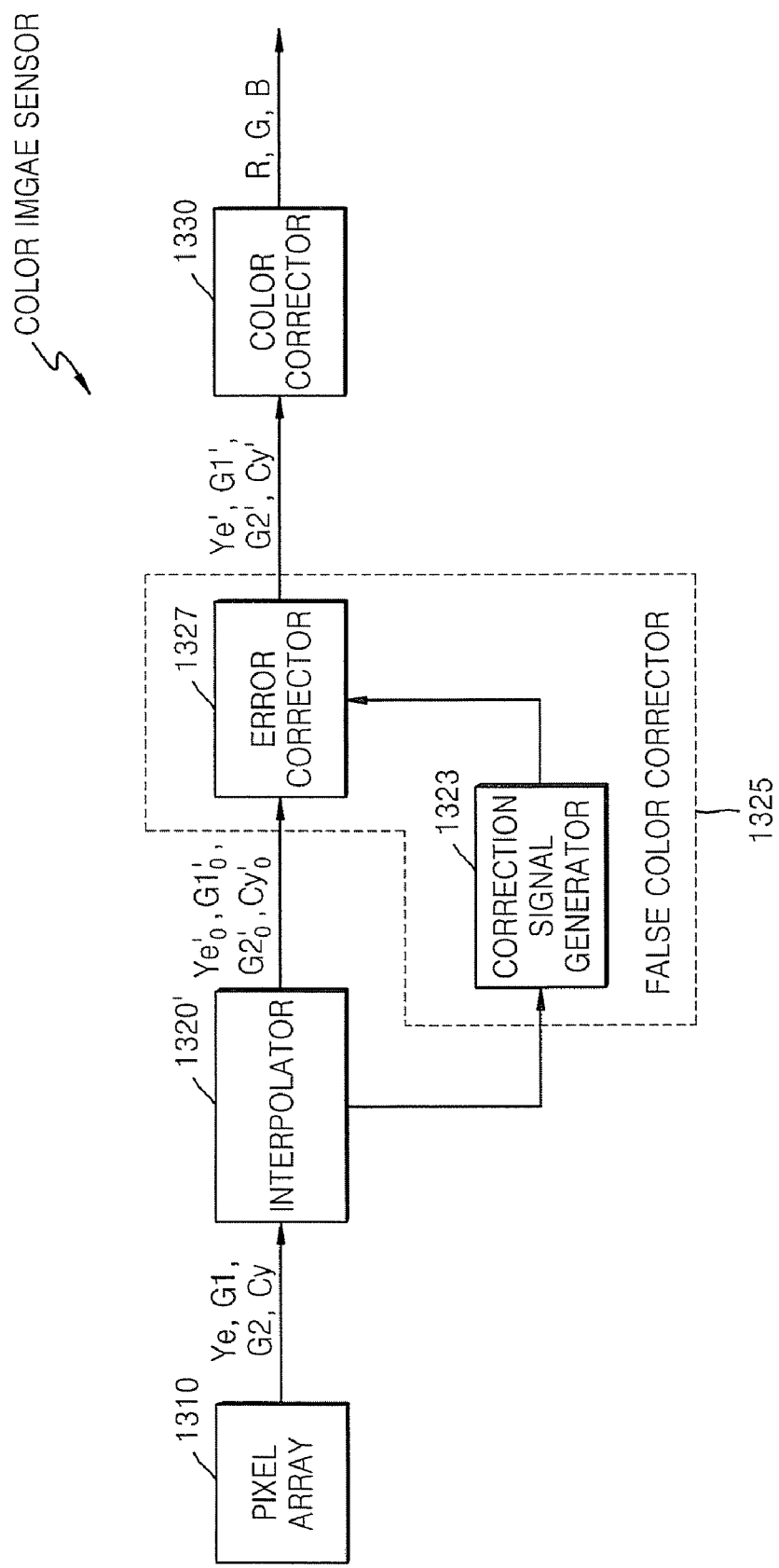
FIG. 16 is a block diagram illustrating false color error correction apparatus and operation in an image sensor apparatus according to some embodiments of the present invention.

FIG. 16 illustrates apparatus and operations according to some embodiments of the present invention that may compensate for interpolation-induced false color errors, implemented in an image processing path along the lines illustrated in FIG. 13. In particular, a pixel array 1310 may generate yellow, green and cyan signals Ye, G1, G2, Cy, which are provided to an interpolator 1320' that interpolates these signals to generate yellow, green and cyan signals $Ye_0'$, $G1_0'$, $G2_0'$, $Cy_0'$ that include interpolated signals. The interpolator 1320' differs from the interpolator 1320 of FIG. 13 in that it is configured to detect pixel positions at which false color errors may occur, generating an indication signal that is provided to a false color corrector circuit 1325. The false color corrector circuit 1325 includes a correction signal generator circuit 1323 that, responsive to the indication signal from the interpolator 1320', controls an error corrector circuit 1327 to correct selected ones of the yellow, green and cyan signals $Ye_0'$, $G1_0'$, $G2_0'$, $Cy_0'$ to produce false color error corrected yellow, green and cyan signals Ye', G1', G2', Cy'. The false color error corrected yellow, green and cyan signals Ye', G1', G2', Cy' may be provided to a color corrector circuit 1330, which may operate on these signals as discussed above with reference to FIG. 13.

Figure 17:
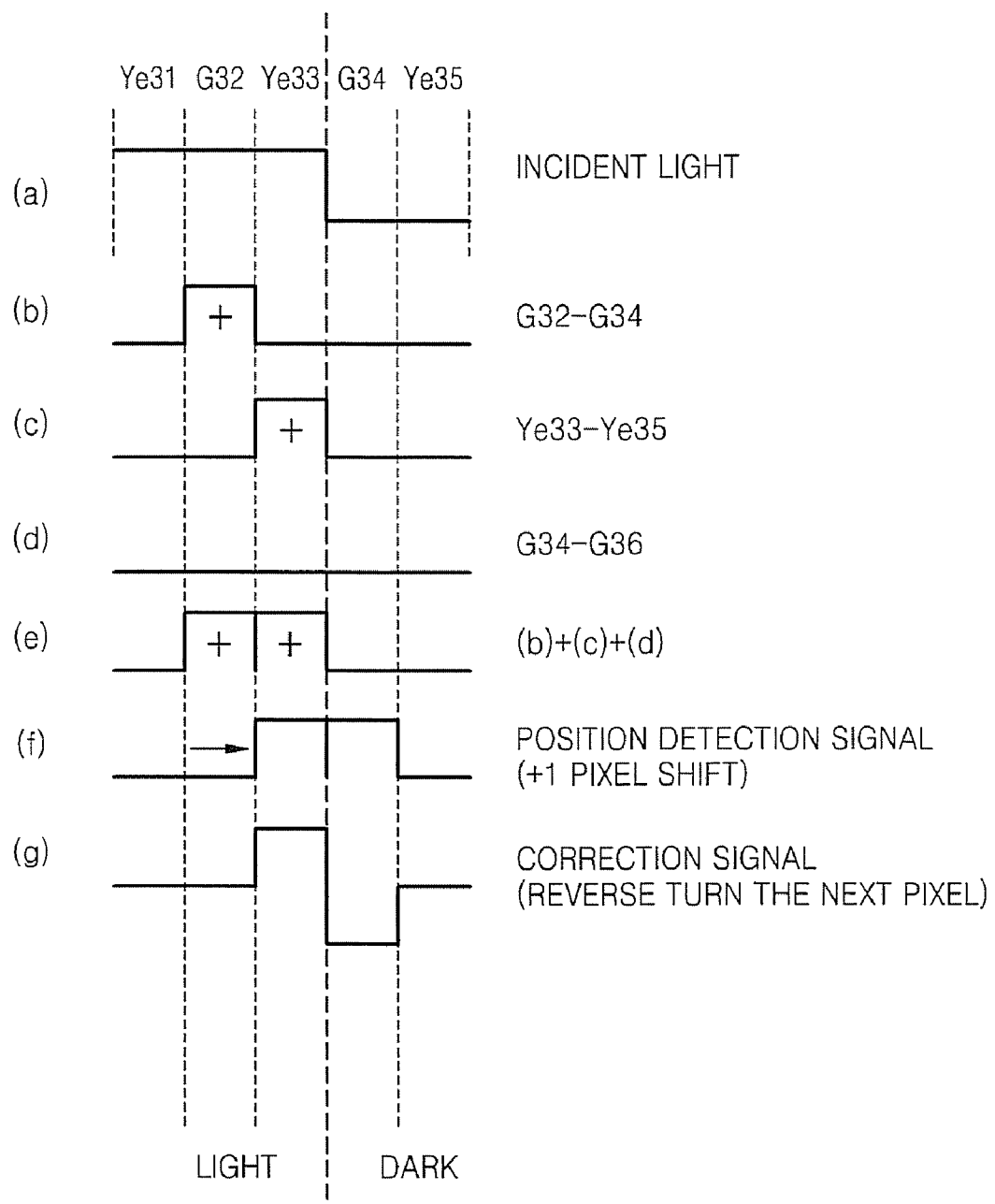
FIGS. 17 and 18 illustrate operations for false color error correction in the image sensor apparatus of FIG. 16.

FIG. 17 illustrate operations of the correction signal generator circuit 1323 of the false color correction circuit 1325 of FIG. 16 according to some embodiments of the present invention. A position detection signal (f) indicative of the position of a boundary between light and dark areas (indicated by (a)) is generated from signals generated for pixels Ye31, G32, Ye33, G34, Y35 by the interpolator circuit 1320'. Signals (b), (c), (d) are indicative of differences between adjacent pixels having the same color indicate peaks at a green pixel G32 and a yellow pixel Ye33. Adding these peak values produces a signal (e), which may be shifted by one pixel to produce a position indication signal (f) with a peak centered on the boundary between the light and dark regions. A correction signal (g) may be generated from the position indication signal (f) by inverting the peak on one side of the point of symmetry.

Figure 18:
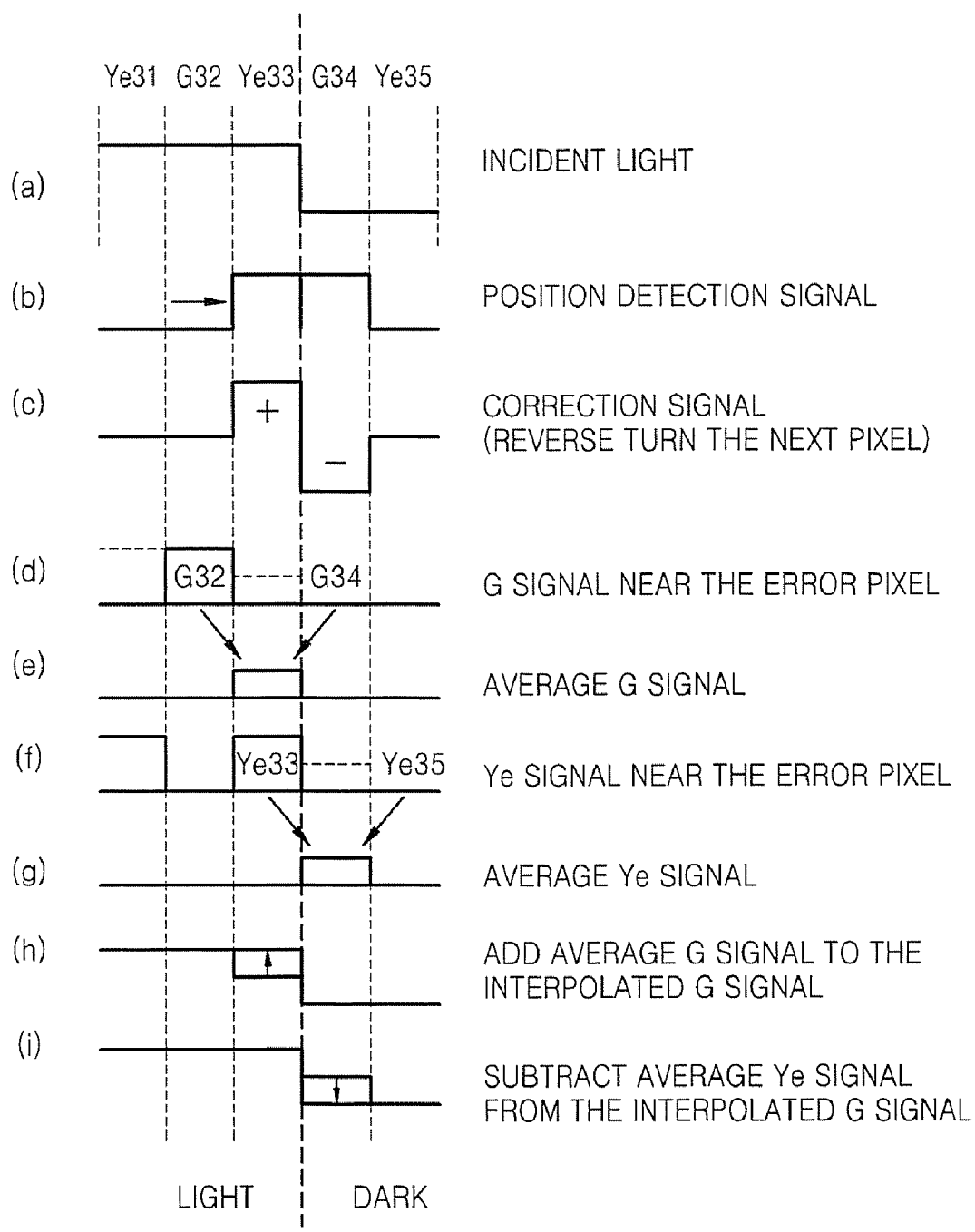

FIG. 18 illustrates operations of the error corrector circuit 1327 of the false color correction circuit 1325 of FIG. 16 according to further embodiments of the present invention. For the incident light pattern shown in FIG. 17 (pattern (a)), position detection and correction signals (b), (c) are generated as discussed above. As shown in (d) and (e), for a pixel Ye33, the error corrector circuit 1327 generates an average green signal from the adjacent green pixel signals G32, G34. Similarly, referring to (f) and (g), for a pixel G34, the error corrector circuit 1327 generates an average yellow signal for the green pixel G34 from the signals for the adjacent yellow pixels Ye33, Ye35. Responsive to the correction signal (c), the error corrector circuit 1327 adds the average G signal for the yellow pixel Ye33 to the interpolated green signal for this pixel generated by the interpolator 1320', and subtracts the average yellow signal from the interpolated yellow signal for the green pixel G34 produced by the interpolator 1320', thus correcting for false colors that may be introduced by the interpolator 1320'.

Figure 19:
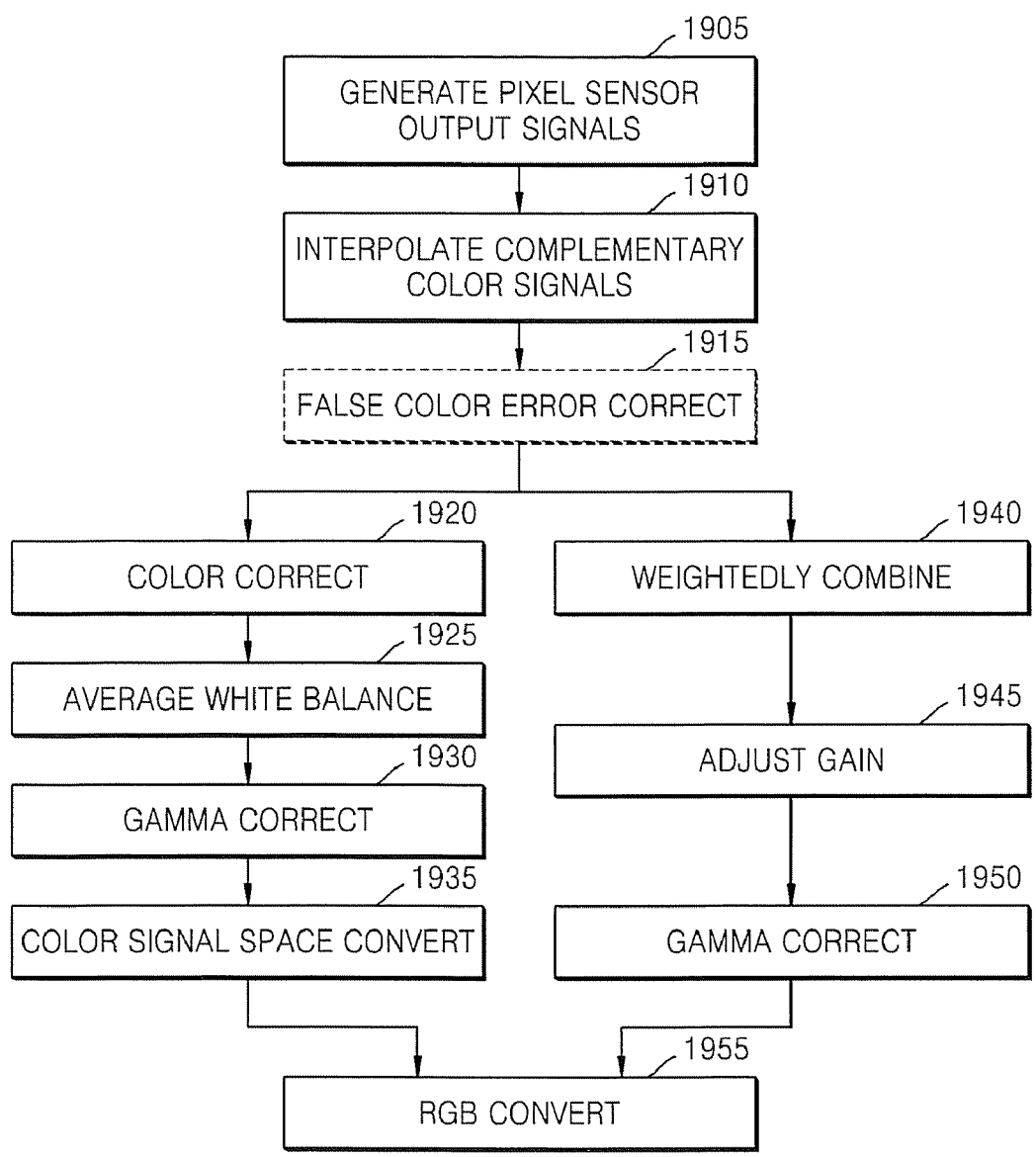
FIG. 19 is a flowchart illustrating operations for processing image signals according to some embodiments of the present invention.

FIG. 19 illustrates exemplary image signal processing operations according to further embodiments of the present invention. Yellow, green and cyan sensor signals are generated by respective yellow, green and cyan filtered sensors, along lines discussed above (block 1905). Complementary yellow, green and cyan signals are then generated for each pixel by interpolation from these primary sensor output signals, e.g., green and cyan signals are interpolated for yellow pixels from signals generated by adjacent green and cyan filtered pixels, yellow and cyan signals are interpolated for green pixels from signals generated by adjacent yellow and cyan filtered pixels, and yellow and green signals are interpolated for cyan pixels from signals generated by adjacent yellow and green filtered pixels (block 1910). The interpolation-processed signals may then be false-color corrected (block 1915) and then color corrected in an RGB transformation as discussed above with reference to FIG. 13 (block 1920). The resulting color corrected signals are then AWB processed and gamma corrected (blocks 1925, 1930) to produce outputs that may be converted to chrominance signals (block 1935), as discussed above with reference to FIG. 13. The interpolation-processed signals are also weightedly combined to produce a luminance signal (block 1940). This luminance signal is gain adjusted and gamma corrected (blocks 1945, 1950). The chrominance and luminance signals may be converted to RGB signals (block 1955).

Figure 20:
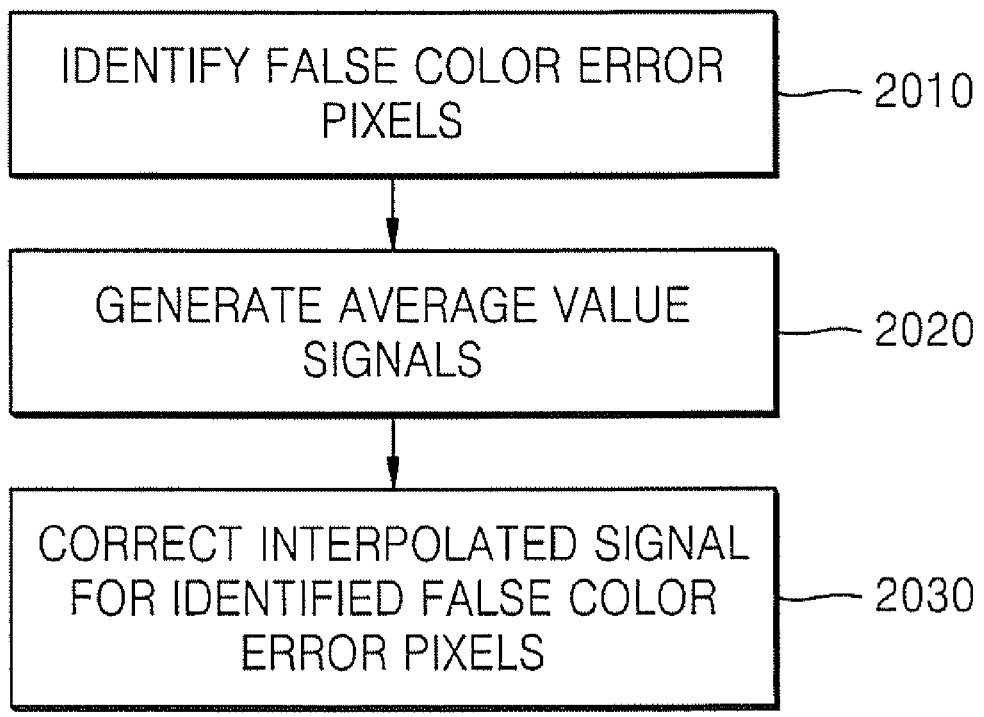
FIG. 20 is a flowchart illustrating operations for false color error correction according to further embodiments of the present invention.

FIG. 20 illustrates exemplary operations for false color error correction according to still further embodiments of the present invention. False color error pixels are identified from yellow, green and cyan sensor signals using, for example, the operations described above with reference to FIG. 17 (block 2010). Average color values for the identified pixels are determined (block 2020), and selectively added and subtracted from interpolated signals for the identified pixels to correct for false color error (block 2030).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. An apparatus comprising:
    an array of color-selective sensors arranged as a plurality of repeating 2×2 unit pixel groups, each sensor of a unit pixel group selective for a color including a green component, the unit pixel group comprising respective sensors selective for respective first and second colors and two sensors selective for a third color, wherein the array comprises columns containing only sensors selective for the third color alternating with columns containing sensors selective for the first and second colors.

2. The apparatus of claim 1, wherein signals from the sensors of the unit pixel groups define a first color signal space, and further comprising an image processor circuit configured to receive image sensor signals from the array of color-selective sensors and to process the image sensor signals to generate image signals in a second color signal space.

3. The apparatus of claim 2, wherein the image processor circuit comprises:
    an interpolator circuit configured to generate, for a pixel having a color filter of a first one of the first, second and third colors, interpolated color signals corresponding to respective second and third ones of the first, second and third colors from signals generated by adjacent sensors having color filters of the respective second and third ones of the first, second and third colors; and
    a color corrector circuit configured to receive the interpolated color signals and to combine the interpolated color signals to produce RGB signals.

4. The apparatus of claim 3, wherein the image processor circuit is further configured to generate a chrominance signal from the RGB signals and to generate a luminance signal from the interpolated color signals.

5. The apparatus of claim 3, wherein the image processor circuit is configured to identify a false color error pixel from image signals received from the color-selective sensors and to responsively compensate an interpolated color signal for the identified false color error pixel.

6. The apparatus of claim 1, wherein a first column of the unit pixel group comprises a yellow filtered sensor and a cyan filtered sensor and wherein a second column of the unit pixel group comprises two green filtered sensors.

7. The apparatus of claim 6, further comprising an image processor circuit configured to generate respective sets of yellow, cyan and first and second green signals for respective pixels and to combine the yellow, cyan and two green signals of the respective sets of yellow, cyan and first and second green signals to produce respective sets of RGB signals for the respective pixels.

8. The apparatus of claim 7, wherein the image processor circuit comprises a crosstalk corrector circuit configured to combine the yellow signal and the first green signal for a given pixel to generate a red signal of the RGB signal set for the given pixel, to combine the cyan signal and the second green signal for the given pixel to generate a blue signal of the RGB signal set for the given pixel, and to combine the first and second green signals for the given pixel to generate a green signal of the RGB signal set for the given pixel.

9. The apparatus of claim 7, wherein the image processor circuit comprises an interpolator circuit configured to receive image sensor signals from the array of color-selective sensors and to generate respective sets of yellow, cyan and first and second green signals for respective pixels from the received image sensor signals.

10. The apparatus of claim 8, wherein the image processor circuit is further configured to apply a color correction matrix to the red signal, blue signal and the green signal of the RGB signal set for the given pixel to generate a color-corrected set of red, green and blue signals for the given pixel.

11. The apparatus of claim 8, wherein the crosstalk corrector circuit is configured to subtract the first green signal from the yellow signal for the given pixel to generate the red signal of the RGB signal set for the given pixel, to subtract the second green signal from the cyan signal for the given pixel to generate the blue signal of the RGB signal set for the given pixel and to average the first and second green signals for the given pixel to generate the green signal of the RGB signal set for the given pixel.

12. A method comprising:
    generating image sensor signals from an array of color-selective sensors arranged as a plurality of repeating 2×2 unit pixel groups, each sensor of a unit pixel group selective for a color including a green component, the unit pixel group comprising respective sensors selective for respective first and second colors and two sensors selective for a third color, the image sensor signals defining a first color signal space, wherein the array comprises columns containing only sensors selective for the third color alternating with columns containing sensors selective for the first and second colors; and
    processing the image sensor signals to generate image signals in a second color signal space.

13. The method of claim 12, wherein processing the image sensor signals to generate image signals in a second color signal space comprises:
    for a pixel having a color filter of a first one of the first, second and third colors, interpolating color signals corresponding to respective second and third ones of the first, second and third colors from signals generated by adjacent sensors having color filters of the respective second and third ones of the first, second and third colors; and
    combining the interpolated color signals to produce RGB signals.

14. The method of claim 13, further comprising:
    generating a chrominance signal from the RGB signals; and
    generating a luminance signal from the interpolated color signals.

15. The method of claim 13, further comprising:
    identifying a false color error pixel from image signals received from the color-selective sensors; and
    responsively compensating an interpolated color signal for the identified false color error pixel.

16. The method of claim 12, wherein a first column of the unit pixel group comprises a yellow filtered sensor and a cyan filtered sensor and wherein a second column of the unit pixel group comprises two green filtered sensors.

17. The method of claim 16, further comprising an image processor circuit configured to generate respective sets of yellow, cyan and first and second green signals for respective pixels and to combine the yellow, cyan and two green signals of the respective sets of yellow, cyan and first and second green signals to produce respective sets of RGB signals for the respective pixels.

18. The method of claim 17, further comprising:
combining the yellow signal and the first green signal for a given pixel to generate a red signal of the RGB signal set for the given pixel;
combining the cyan signal and the second green signal for the given pixel to generate a blue signal of the RGB signal set for the given pixel; and
combining the first and second green signals for the given pixel to generate a green signal of the RGB signal set for the given pixel.

19. The method of claim 18:
wherein combining the yellow signal and the first green signal for the given pixel to generate a red signal of the RGB signal set for the given pixel comprises subtracting the first green signal from the yellow signal for the given pixel to generate the red signal of the RGB signal set for the given pixel;
wherein combining the cyan signal and the second green signal for the given pixel to generate a blue signal of the RGB signal set for the given pixel comprises subtracting the second green signal from the cyan signal for the given pixel to generate the blue signal of the RGB signal set for the given pixel; and
wherein combining the first and second green signals for the given pixel to generate the green signal of the RGB signal set for the given pixel comprises averaging the first and second green signals for the given pixel to generate the green signal of the RGB signal set for the given pixel.

20. The method of claim 18, further comprising applying a color correction matrix to the red signal, blue signal and green signal of the RGB signal set for the given pixel to generate a color-corrected set of red, green and blue signals for the given pixel.

21. A crosstalk correction method comprising:
receiving a set of color signals for a pixel, the set of color signals including a yellow signal, a cyan signal, a first green signal and a second green signal;
combining the yellow signal and the first green signal to generate a red signal of an RGB signal set;
combining the cyan signal and the second green signal to generate a blue signal of the RGB signal set; and
combining the first and second green signals to generate the green signal of the RGB signal set.

22. The method of claim 21:
wherein combining the yellow signal and the first green signal to generate a red signal of the RGB signal set comprises subtracting the first green signal from the yellow signal to generate the red signal of the RGB signal set;
wherein combining the cyan signal and the second green signal to generate a blue signal of the RGB signal set comprises subtracting the second green signal from the cyan signal to generate the blue signal of the RGB signal set; and
wherein combining the first and second green signals to generate the green signal of the RGB signal set comprises averaging the first and second green signals to generate the green signal of the RGB signal set.

23. A false color error correction method for correcting false color errors generated by color signal interpolation from sensor signals from an array of pixel sensors including sensors of a first color and a sensors of a second color interleaved in a row of the array, the method comprising:
for each pixel of the row, determining a difference between a sensor signal output of the sensor and a sensor signal output from a sensor of the same color nearest thereto in a first direction;
identifying a pair of adjacent pixels of the first and second colors responsive to the determined differences; and
compensating interpolated color signals for the identified pair of adjacent pixels.

24. The method of claim 23, wherein compensating interpolated color signals for the identified pair of adjacent pixels comprises:
for the pixel of the first color, adding an average of color signal values for pixels of the second color on respective sides of the pixel of the first color to an interpolated color signal of the second color associated with the pixel of the first color; and
for the pixel of the second color, subtracting an average of color signal values for pixels of the first color on respective sides of the pixel of the second color to an interpolated color signal of the first color associated with the pixel of the second color.

* * * * *